Feb. 26, 1957 R. A. SMITH 2,782,561
TREE SURROUNDING RING
Filed July 22, 1954

INVENTOR.
ROBERT A. SMITH
BY
ATTORNEY

United States Patent Office 2,782,561
Patented Feb. 26, 1957

2,782,561

TREE SURROUNDING RING

Robert A. Smith, Haskell, N. J.

Application July 22, 1954, Serial No. 444,978

3 Claims. (Cl. 47—25)

The present invention relates to a tree surrounding ring adapted to provide a neater and more attractive appearance of an area around the tree and further to guard the tree itself.

It is, therefore, one object of the present invention to provide a tree surrounding ring which has downwardly projecting means for securing the ring more or less permanently to the ground.

It is another object of the present invention to provide a tree surrounding ring which is made integrally of one piece yet of elastic material in order to permit the spacing of its ends while being set around the tree, which ends are then connected again and specific means are provided to keep the engaging ends in locked position.

It is a further object of the present invention to provide a tree surrounding ring which comprises a plurality of complementary portions which may be set up in a curved, polygonal or any other desirable configuration and each pair of adjacent ends of said portions being equipped with means for locking together those ends.

It is yet a further object of the present invention to provide a tree surrounding ring which is of preferably U-shaped channel form open at its top and having a plurality of perforations at its bottom, which channel is adapted to receive a flower bed following the specific configuration of the ring while surrounding the tree.

It is also a still further object of the present invention to provide a tree surrounding ring comprising a plurality of complementary portions and the ends of each pair of adjacent portions have latch like projections and a crosswise disposed slot near the end portions, and the said latch like projection is adapted to be bent and to be inserted in the slot of the adjacent portion.

With these and other objects in view, which will become apparent in the following detailed description, the present invention will be clearly understood in connection with the accompanying drawing, in which.

Figure 1:
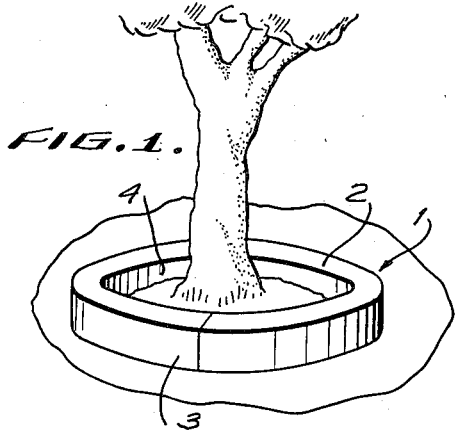
Figure 1 is a perspective front view of a tree surrounding ring in mounted position.
Figure 2:
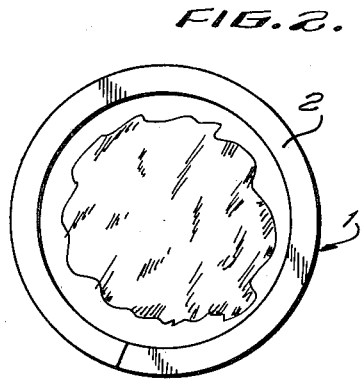
Fig. 2 is a top view of the tree surrounding ring, the tree being shown from the top.
Figure 3:
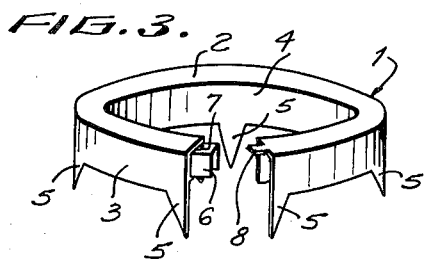
Fig. 3 is a perspective front view of a tree surrounding ring formed integrally of one piece.

Referring now to the drawing, and in particular to Figs. 1, 2, and 3, it will be found that in this embodiment the ring 1 is made integrally of one piece and substantially of U-cross section, the base 2 of the U-cross section being on top of the ring and forming an outer vertical wall 3 and an inner vertical wall 4. In order to permit the ring 1 to be mounted around the tree, the ring must be of resilient material so that the ends may be bent from each other to be connected again after passing the tree.

The vertical walls 3 and 4 are equipped with a plurality of downwardly extending integral projections 5 which secure the ring 1 in the ground.

Any suitable means may be used for locking the adjoining ends of the ring 1. The particular means disclosed clearly in Fig. 3 comprises a U-shaped projection member 6 of narrower width than that of the ring 1 yet likewise of U-cross section, the base of which is equipped with a slot 7. The opposite end of the ring 1 has merely a latch 8 of a width equivalent to that of the slot 7 and is adapted to be bent downwardly and to be received by the slot 7. In this position, the projection member 6 is disposed inside the opposite end of the ring 1 and is secured in this position by means of the latch 8 being inserted in the slot 7 of the projection member 6.

Figure 4:
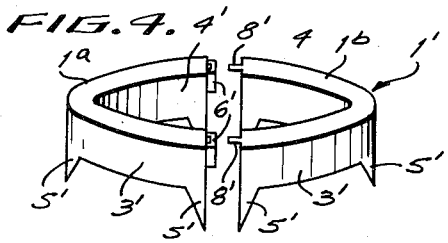
Fig. 4 is a perspective front view of a tree surrounding ring made of two pieces with means for locking together the said two pieces.

While the embodiment disclosed in Fig. 3 shows the ring formed of one integral piece, it is quite clear that such a ring may be composed of a plurality of portions to be connected to each other, which arrangement lends itself to the formation of different designs, as for instance, heart design, lettering, names and the like. A very simple embodiment of this type is shown in Fig. 4 where merely half-circular portions $1^a$ and $1^b$ are devised to form the entire ring $1'$. The portions $1^a$ and $1^b$ and also outer walls $3'$ and inner walls $4'$ as well as projections $5'$ for securing the respective portions $1^a$ and $1^b$ in the ground are provided.

Figure 5:
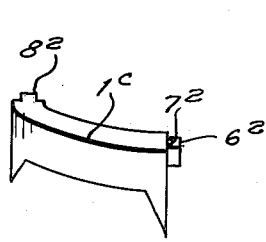
Fig. 5 is a perspective front view of one section of the tree surrounding ring.
Figure 9:
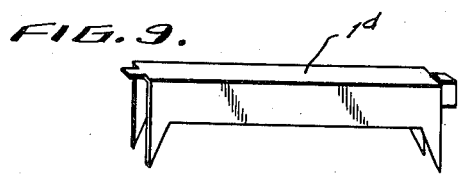
Fig. 9 is a perspective front view of a linear portion of the ring.

As clearly shown in Fig. 5 the ring may be composed of a great number of smaller portions $1^c$ of any desirable curvature to arrive at any predetermined design surrounding the tree. The locking means used in the embodiment shown in Figs. 4 and 5 may be identical with those disclosed in Fig. 3 by providing the projection members $6'$ and $6^2$ and the latch $8'$ and $8^2$, respectively. It is, of course, further possible to include linear portions $1^d$ (Fig. 9) into the entire design of the ring.

In order to provide the possibility that a special flower bed of any predetermined design surrounds the tree, the ring $1^e$, instead of having the base of the U-cross section of the ring on its top, the base $2^e$ is lowered down, thereby, providing a U-shaped channel $9^e$ in the ring in which dirt may be inserted and thus a flower bed of predetermined design may be created. The base $2^e$ has preferably a plurality of perforations $10^e$ to permit escape of any precipitation through the flower bed.

Figure 6:
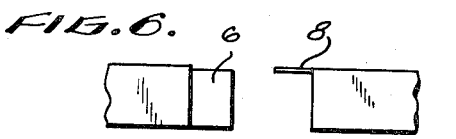
Fig. 6 is a fragmentary elevational view of the locking means for two engaging portions of the ring.
Figure 7:
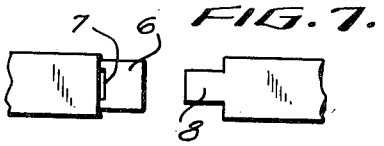
Fig. 7 is a fragmentary top plan view of the means shown in Fig. 6.
Figure 8:
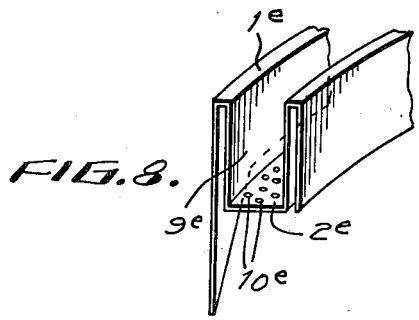
Fig. 8 is a fragmentary perspective view of a portion of the ring formed as a channel.

Figs. 6 and 7 show in somewhat enlarged scale the locking means for adjacent ends of the ring portions by providing the projection member 6 with a slot 7 on one end and the latch portion 8 on the other end.

While I have disclosed several embodiments of the present invention, it is to be understood that these embodiments are given by example only and not in a limiting sense, the scope of the present invention being determined by the objects and the claims.

I claim:

1. A tree surrounding ring device comprising at least one portion having detachable connected ends, the said portion having an inner and outer vertical wall of substantially equal height and being spaced apart from each other and a substantially horizontal base connecting the said vertical walls, the lower edge of the said vertical walls being adapted to engage the ground, the said inner and outer vertical wall having downwardly extending projections securing the said ring device in the ground, one of the said detachable connecting ends having a channel-like projection member of a width narrower than the said base and disposed slightly lower than the latter, the said projection member having a crosswise disposed slot in the upper portion thereof, and the other of the said detachably connecting ends having a latch adapted to be disposed vertically when inserted into the slot of the said projection member so that the connected ends engage in such manner that the base of one end is flush with the base of the other end.

2. The tree surrounding ring device, as set forth in claim 1, in which the said base is disposed on top of the vertical walls.

3. The tree surrounding ring device, as set forth in claim 1, in which the said base is disposed below the top edges of the said vertical walls to form a channel adapted to serve as a flower bed, and the said base has a plurality of perforations to permit the escape of water.

References Cited in the file of this patent

UNITED STATES PATENTS

| | | |
|---|---|---|
| 313,424 | Hughes | Mar. 3, 1885 |
| 1,977,021 | Spencer | Oct. 16, 1934 |

FOREIGN PATENTS

| | | |
|---|---|---|
| 1,048 | Great Britain | 1894 |
| 102,231 | Great Britain | Nov. 23, 1916 |
| 417,724 | Great Britain | Oct. 11, 1934 |